May 28, 1935. R. LANG 2,003,151
BAKING PAN
Filed June 19, 1933 3 Sheets-Sheet 1

INVENTOR
Rose Lang
BY
Popp and Powers
ATTORNEYS

May 28, 1935.  R. LANG  2,003,151
BAKING PAN
Filed June 19, 1933  3 Sheets-Sheet 2

INVENTOR
Rose Lang
BY
Popp and Powers
ATTORNEYS

May 28, 1935. R. LANG 2,003,151
BAKING PAN
Filed June 19, 1933 3 Sheets-Sheet 3
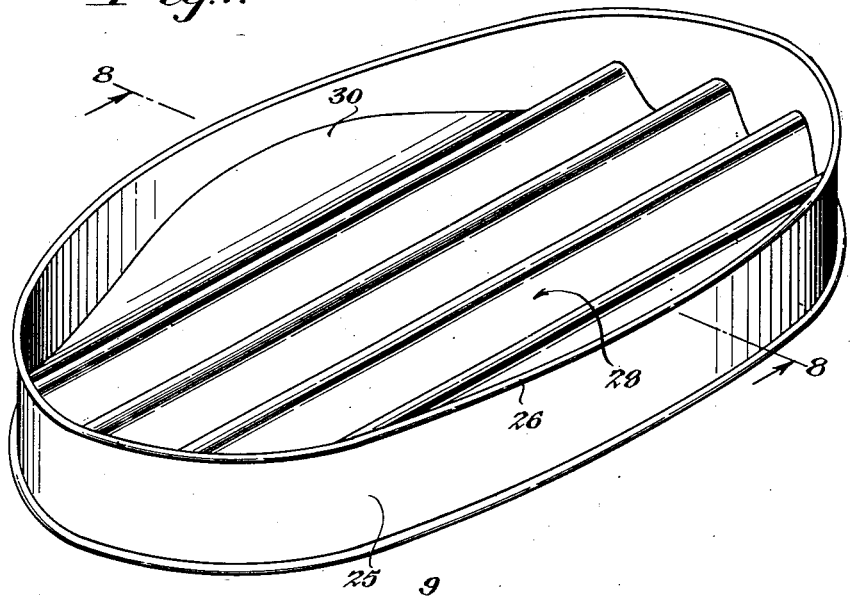
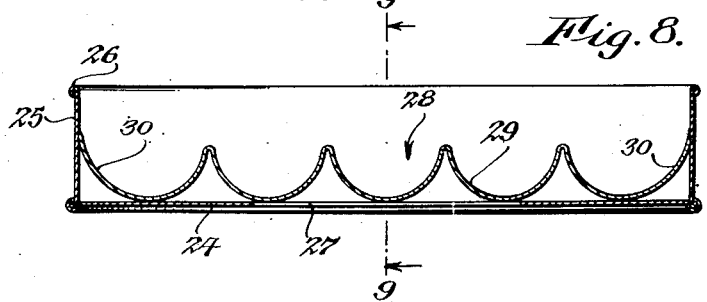
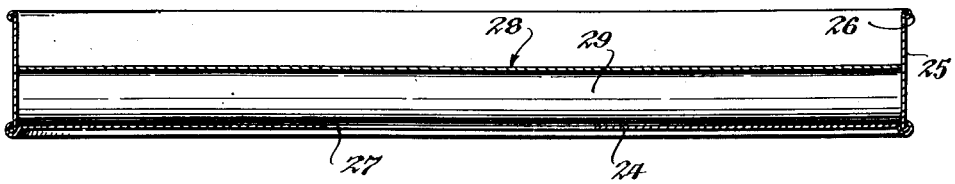
INVENTOR
*Rose Lang*
BY
*Popp and Powers*
ATTORNEYS Patented May 28, 1935

2,003,151

UNITED STATES PATENT OFFICE 2,003,151

BAKING PAN

Rose Lang, Buffalo, N. Y.

Application June 19, 1933, Serial No. 676,450

7 Claims. (Cl. 53—6)

This invention relates to improvements in baking pans which, while not necessarily so limited, are particularly adapted to the baking of cakes, pies and other articles of pastry.

One object of the invention is to provide a baking pan of the type generally described which is adapted to mold the surface portion of the cake or article of pastry into an ornamental design and thereby render it more pleasing and attractive in appearance.

A further object is to provide for facility in removing the cake or article of pastry from the pan after the baking operation.

A still further object is to provide a pan which is adaptable to enable the molding of the surface portion of the cake or article of pastry into any one of various ornamental designs.

A still further object is to provide a pan which may be employed as an ordinary baking pan in the event that ornamentation of the cake or article of pastry is not desired.

Embodiments of the invention are illustrated in the accompanying drawings, in which:

Figure 7 is a perspective view of a further modified form of pan.

Figure 8 is a transverse section taken along line 8—8 of Figure 7.

Figure 9 is a vertical longitudinal section taken along line 9—9 of Figure 8.

Figure 1:
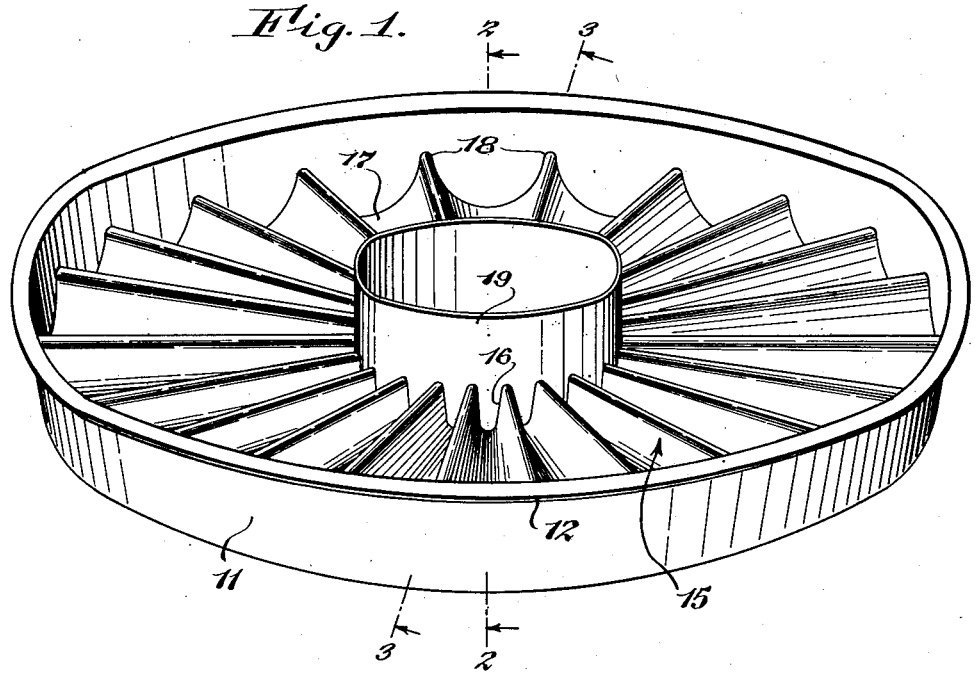
Figure 1 is a perspective view of a pan in which features of the invention are incorporated.
Figure 2:
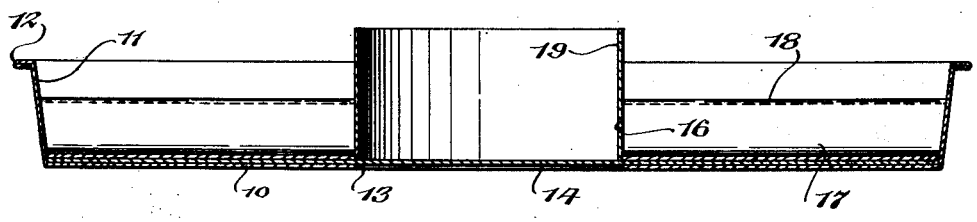
Figure 2 is a radial section taken along line 2—2 of Figure 1.
Figure 3:
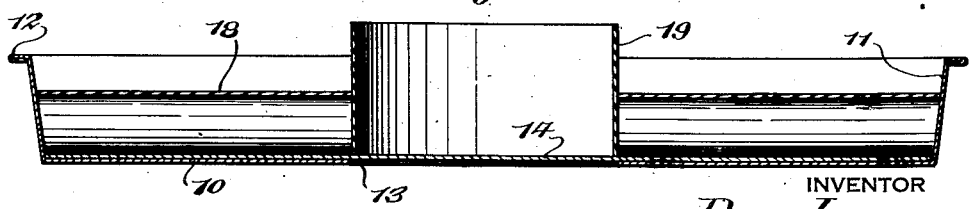
Figure 3 is a similar section taken along line 3—3 of Figure 1.

The pan, as illustrated in Figures 1, 2 and 3, is circular in shape and includes a bottom wall 10 and an annular vertical side wall 11, the latter being provided along its upper margin with a suitable reinforcing bead 12 in accordance with conventional practice. The bottom wall 10 is formed with a centrally located opening 13. A removable plate 14 is arranged in the bottom of the pan over the said opening, said plate preferably being of a diameter such that it covers the entire bottom of the pan.

In accordance with the invention a molding member 15 is also arranged in the bottom of the pan, the said member, in the present embodiment, resting upon the plate 14 and being substantially co-extensive therewith. The member 15, which is preferably of a flexible character, is adapted to form an ornamental design upon the bottom of the cake or article of pastry. The pattern of the mold may be of any desired design. As illustrated, the molding member 15 is formed with a central opening 16 and radially extending corrugations, the latter including depressions 17 which are de-limited by ridges 18. The depressions are adapted to form radially extending petal-like elevations upon the cake or article of pastry. A ring 19 is arranged in the opening 16 upon the plate 14, the said ring co-operating with the side wall 11 of the pan to close the inner and outer ends of the depressions 17.

In the use of the pan, for example, in the baking of a cake, the parts are assembled in the manner shown and the dough is placed in the pan, the dough, of course, filling the depressions 17. When the baking operation has been completed, the cake is removed from the pan by forcing the plate 14 out of the pan, the opening 13 enabling access to the said plate for this purpose. The plate carries with it, as a unit, the molding member 15, the ring 19 and the cake. Upon removal of the ring 19, the cake is inverted and the molding member 15 removed. Owing to the flexibility of the molding member the separation of the cake from it is facilitated. That part of the cake from which the molding member is removed is intended to be the top of the cake. Hence, as the cake is inverted to enable removal of the molding member it is turned right side up. The opening which is provided in the center of the cake by the ring 19 may be filled with a suitable pastry which will represent the center of the flower of which the radially extending elevations represent the petals. The cake may, if desired, be employed as the top layer of a layer cake. In this event the remaining layers of the cake may be of a conventional form, it being understood that the pan may, if desired, be made available for this purpose.

Figure 4:
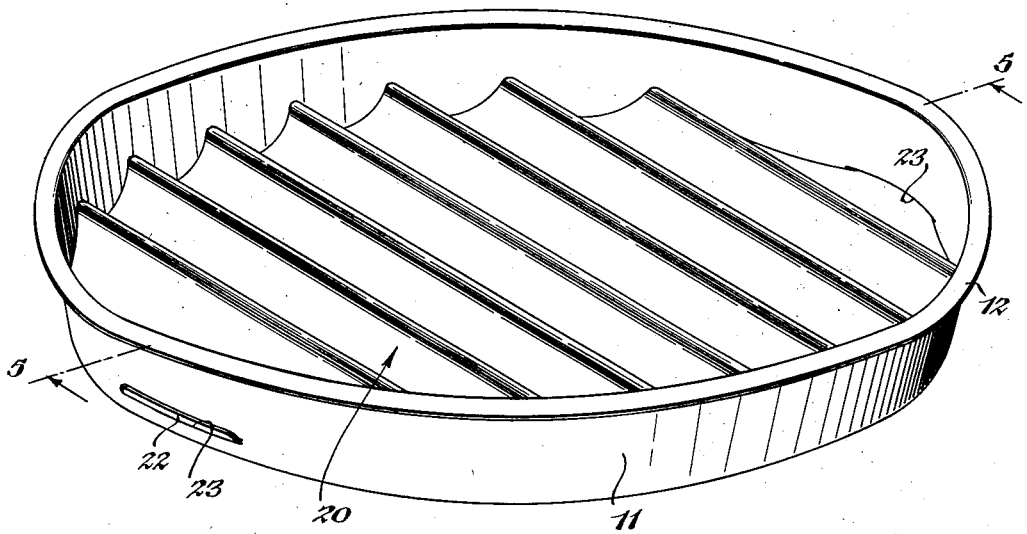
Figure 4 is a perspective view of a modified form of pan.
Figure 5:
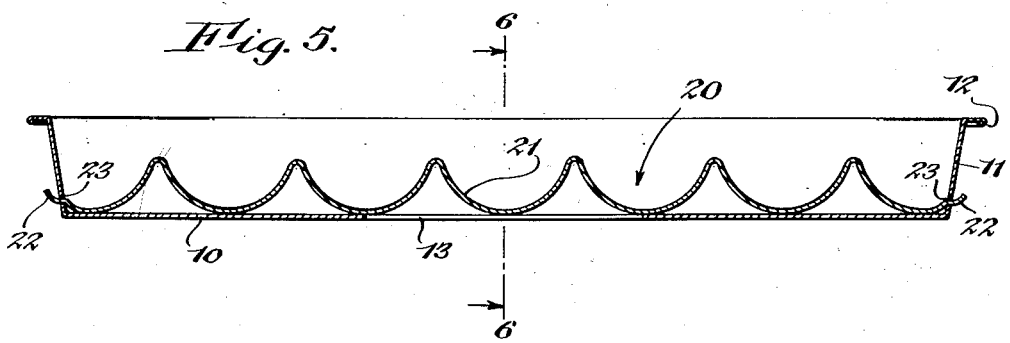
Figure 5 is a radial section taken along line 5—5 of Figure 4.
Figure 6:
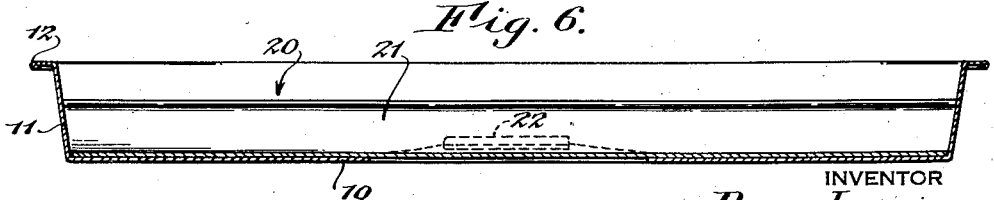
Figure 6 is a vertical section taken along line 6—6 of Figure 5.

In the embodiment shown in Figures 4, 5 and 6 the pan is of the same general shape as that illustrated in Figure 1. In this embodiment, however, the molding member 20 is imperforate and the corrugations 21 are parallel and unbroken throughout their extent. In order to secure the molding member in the pan it may, as illustrated, be formed at opposite sides with tongues 22. The latter are adapted to be inserted through openings 23 which are formed in the side wall 11 of the pan as the molding member is arranged in the bottom of the pan. The tongues may be readily inserted in their respective openings by flexing the molding member slightly as it is placed in the pan. In this embodiment a plate such as the plate 14 of the embodiment shown in Figure 1 is unnecessary. Access to the molding member 20, therefore, may be had directly through the opening 13 when it is desired to remove it, the tongues 22 being withdrawn through the openings 23 as the center of the molding member is forced upwardly.

The pan illustrated in Figures 7, 8 and 9 is oval in shape. It includes a bottom wall 24 and a vertical side wall 25, the latter being reinforced along its upper edge by a bead 26. The bottom wall is formed with a centrally located opening 27. In this embodiment the molding member 28 rests directly upon the bottom of the pan and, similarly to the molding member illustrated in Figure 4, is imperforate and is formed with parallel corrugations 29. The corrugations are preferably formed so that they extend lengthwise of the molding member, the outer walls 30 of the two marginal corrugations preferably being of a greater height than the walls which delimit the intermediate corrugations. The molding member may be removed from the pan to effect removal of the cake in substantially the same manner as described in connection with Figure 4, it being understood that in this embodiment as well as that shown in Figure 4, a plate similar to the plate 14 shown in Figure 1, may be employed without the use of the molding member when ornamentation of the cake or article of pastry is not desired, for example, when the cake is to form one of the intermediate layers of a layer cake.

From the foregoing it will be apparent that as the molding members are removable they may be of various designs and a plurality of them may be employed in connection with each pan. A further advantage obtained is that when the pan is used, for example, for the baking of a layer cake, the molding member may be utilized for the baking of the top layer of the cake and then dispensed with during the making of the remaining layers of the cake. It is understood, of course, that the molded top of the cake, whether it be an individual cake or the layer of a layer cake, may be, and preferably is, coated with an icing or frosting in accordance with conventional practice.

I claim as my invention:

1. A cake pan of the type described including a receptacle having bottom and side walls and a removable member arranged in the bottom of said receptacle for molding an ornamental design upon the under side of the cake, said bottom wall being formed with an opening through which access may be had to said molding member to remove it from said receptacle.

2. A cake pan of the type described including a receptacle having bottom and side walls and a removable member arranged in the bottom of said receptacle for molding an ornamental design upon the under side of the cake, said molding member being substantially co-extensive with the bottom wall of said receptacle, said bottom wall being formed with an opening through which access may be had to said molding member to remove it from said receptacle.

3. A cake pan of the type described including a receptacle having bottom and side walls, said bottom wall being formed with an opening, a plate arranged upon said bottom wall over said opening, a member arranged upon said plate for molding an ornamental design upon the under side of the cake, said molding member being formed with a centrally located opening and a ring located in said last mentioned opening for forming a central opening in said cake.

4. A cake pan of the type described including a receptacle having bottom and side walls, said bottom wall being formed with an opening, a plate arranged upon said bottom wall over said opening, a member arranged upon said plate for molding an ornamental design upon the under side of the cake, said member being formed with a substantially centrally located opening and radially extending corrugations and a removable ring located in the last named opening for forming a central opening in said cake.

5. A pan of the type described including a receptacle having bottom and side walls, said bottom wall being formed with an opening, a plate arranged upon said bottom wall over said opening, a molding member arranged upon said plate, said molding member being substantially coextensive with the bottom wall of said receptacle and having a substantially centrally located opening, said molding member being formed with radially extending corrugations and a removable ring located in said last named opening, said ring co-operating with the side wall of said receptacle to close the ends of said corrugations.

6. A pan of the type described including a receptacle having bottom and side walls, said side walls being formed with openings and a resilient molding member arranged in the bottom of said receptacle, said molding member being substantially co-extensive with the bottom wall of said receptacle and being formed with tongues which may be inserted in said openings when it is flexed.

7. A pan of the type described including a receptacle having bottom and side walls, said side walls being formed with openings, and a molding member arranged upon the bottom wall of said receptacle, said molding member being substantially co-extensive with said bottom wall and being formed with tongues which may be inserted in said openings when it is flexed, said bottom wall being formed with an opening through which access may be had to said member.

ROSE LANG.